Patented June 24, 1941

2,247,087

UNITED STATES PATENT OFFICE 2,247,087

PROCESS FOR THE PRODUCTION OF HYDROCARBONS

Wilhelm Herbert, Frankfort-on-the-Main, Germany, assignor to American Lurgi Corporation, New York, N. Y., a corporation of New York No Drawing. Application December 13, 1937, Serial No. 179,611. In Germany November 30, 1936

7 Claims. (Cl. 260—449)

This invention relates to a process for the production of hydrocarbons containing mainly solid paraffin.

In the catalytic conversion of gases containing oxides of carbon and hydrogen, with or without pressure and at temperatures below those at which carbon dioxide and methane form, the chief products, hydrocarbons of the $C_{10}$ series and downwards, are mainly obtained when operating under conditions designed to lengthen the working life of the contact mass. In many cases, however, a higher yield of hard paraffin is desired, since this product is a valuable starting material for the synthesis of fatty acids.

The catalytic conversion of gases containing carbon monoxide and hydrogen was disclosed through the researches of Franz Fischer and his collaborators ("Ges. Abhandlungen zur Kenntnis der Kohle," published by Girardet, Essen (Ruhr), Germany, 1925–1936). Suitable catalyzers for this benzine synthesis are the known iron, cobalt and nickel catalyzers the manufacture of which has been described, for example by Franz Fischer in the journal "Brennstoffchemie," vol. 12, No. 12 (15.6.31) pp. 225–244. In the process hereinafter described, use is made, for example, of a catalyzer containing 33% of cobalt, 6% of thorium oxide, and 61% of kieselguhr. The manufacture of this catalyzer from a nitrate solution of the metals by means of sodium carbonate is described in "Brennstoffchemie," vol. 19, No. 4 (15.2.32), pp. 61–80. Any other convenient catalyzer, may, however be used.

It has been ascertained that most of the methods leading to an increased yield of paraffin shorten the working life of the contact mass, since the mass gradually becomes clogged with products of high boiling point. It has also been established that larger yields of paraffin can be obtained, while not substantially impairing the life of the contact mass, by keeping the latter continuously or periodically irrigated or sprinkled with liquid paraffin dissolving hydrocarbons such as the fractions of the higher-boiling products of the synthesis, e. g. gasolines (benzine) and oils.

It is already known, it is true, to free exhausted contact masses from paraffin by extraction, but this does not furnish the same results as in the present invention. These results are produced only when a substantial enrichment of the contact mass with paraffin solid at normal temperature is permanently rendered impossible, since it has been ascertained that the tendency to form paraffin diminishes enormously as the saturation of the contact mass with paraffin increases. If, for example, the contact mass be extracted only when exhausted, that is, after it has absorbed from 100 to 300% of paraffin, the total recoverable amount of paraffin with reference to the total hydrocarbons liquefiable at normal pressure and temperature is only from 5 to 10%. If the paraffin content in the contact mass be kept at from 50 to 80%, the amount of paraffin recovered is from 15 to 20%, with reference to the liquid products. If, however, the paraffin concentration of the contact mass be kept below 20%, the yield of paraffin amounts to from 30 to 50% and more of the total quantity of liquid products, particularly if a higher pressure for the catalytic conversion is applied.

The constant diminishing of the loading of the contact material with paraffin below the limit indicated, in accordance with the invention, may be achieved in the most diverse ways. The means which may be employed for this purpose are described individually below in greater detail, such as the continuous withdrawal of the paraffin formed from the contact material by physical means, adsorptive and adhesive means, for example by the use of porous masses or with the aid of organic solvents which are constantly or periodically passed over the contact material, such as benzines, oils or solvents containing oxygen or nitrogen, such as acetone, alcohols, aniline, and the like, or finally by varying the irrigation and the path of the gas within the contact furnace as well as by passing the gas upwardly through the catalyst instead of downwardly. In addition, the periodical application of a vacuum, and/or the elevation of the temperature of the catalytic conversion either alone or in conjunction with the aforesaid means and preferably with the simultaneous introduction of hydrogen, is advantageous.

The various means for the reduction of the paraffin load of the contact material may be combined with further measures for increasing the yield of paraffin, which could not be applied with advantage without the invention. Among such measures are to be mentioned:

(1) The employment of thicker contact layers, for example of more than 10 mm. ("thickness" of the contact layers here means the distance between two cooling elements of the contact furnace).

(2) The employment of elevated pressures, such as from two atmospheres to 300 atmospheres and over (preferably from 10 to 50 atmospheres).

(3) A longer period during which the gases remain in the contact mass, for example more than one minute—for example from 3 to 10 minutes approximately in proportion with the elevation of pressure.

(4) The employment of highly concentrated contact masses, such as those containing more than 33%, say 40% by weight of hydrogenating metals or highly concentrated by volume of the contact mass, i. e. more than 100 grms. cobalt or other activated metals per litre of a granulated rigidly arranged catalyzer.

(5) The employment of gas mixtures with an excess of carbon monoxide over hydrogen, above the ratio 1:2.

(6) The employment of gas mixtures containing more than 90% of carbon monoxide plus hydrogen.

(7) Passing the gas upwardly through the catalyst in the contact furnace.

The paraffin content can also be kept low by other methods than extraction by irrigation. Thus, capillary means may be employed for removing the paraffin in a liquid condition at the temperature of the catalytic conversion. For example, porous rods or the like (composed, for example, of ceramic material or fritted metal) may be inserted in the interior of the contact mass where they become impregnated with paraffin and conduct the latter downwards so that, for example, it will drip from the rods or the like. It is advantageous to keep the rods, tubes or the like, warmer at the bottom than at the top, the dripping of the paraffin being thereby facilitated and a capillary drop established, between top and bottom, which facilitates the diffusion of the paraffin out of the contact mass. The porous bodies may also be heated below to such an extent as to vaporise the paraffin from their surface, this measure also intensifies the capillary flow of liquid paraffin.

Instead of, or also in combination with, the aforesaid porous rods for removing the paraffin from the contact material, use may be made, according to the invention, of organic solvents, which are passed or sprayed over the contact mass during the passage of the synthesis gas through the contact furnace, while, if desired, the solvents may be passed transversely to the direction of flow of the gas or in counterflow thereto by passing the gas upwardly through the catalyst. The atomization of the solvents can be effected by pressure or by means of a gaseous medium, if desired by the vapours of the solvent itself, or the contact masses may be irrigated with the solvent, which is done particularly simply when, as described hereinafter, the synthesis gases are passed upwardly through the contact furnace.

The principle object of the solvents employed in accordance with the invention is to afford continuous removal of substances which damage the catalyzer, for example high boiling hydrocarbons, such as paraffin or the like, or contact poisons, particularly the resins. Substances which possess great powers of dissolving the resinous substances to be removed, such as alcohols, ketones, acetone, stable esters and other similar solvents, have been found to be particularly effective. However, liquid products of the hydrocarbon synthesis itself may also be used. If, for example the synthesis is carried out at atmospheric pressure, Diesel oil fractions which boil between 200 and 300° C. may, for example, be used in the process of the invention.

On the other hand, the synthesis reaction may be influenced simultaneously with the treatment of the catalyzer with solvents, for example in such a way that undesirable side reactions are suppressed. For this purpose, for example, nitrogen containing solvents, such as liquid ammonia, anilines, amines, triethanolamin, nitrobenzol, tetrammonium bases or the like, may be used. These have the advantage that the acids produced are also neutralised.

The method of operation in accordance with the invention has further particular advantages when it is carried out in conjunction with the performance of the synthesis under superatmospheric pressure, for example a pressure of several atmospheres. In the known processes for the catalytic conversion of carbon monoxide and hydrogen-containing gases into hydrocarbon compounds, which are used in the usual proportion 1:2, the application of positive pressure was not practicable, because the action of the catalyzer fell an inadmissible extent even in a few hours. This drawback is overcome by the process of the invention owing to the fact that the causes of the rapid decline in the activity of the catalyzer are constantly removed during the actual synthesis.

The solvents are usually so chosen, in accordance with the invention, that, under the conditions of pressure and temperature prevailing in the synthesis or the individual stages thereof, they evaporate only to a more or less considerable extent. The boiling points thus lie, preferably, higher than the reaction temperatures, under the pressure employed for the synthesis. If the pressure varies in the individual stages of the synthesis, when the latter is carried out in more than one stage, different solvents with different boiling points may also advantageously be employed in the various stages.

The process of the invention can also be varied in the sense that only a part of the contact mass, and not the whole of same, is treated with solvent, while another part does not come into direct contact with the solvent. For example, according to the invention, only those parts of the contact mass the activity of which is shown by experience to fall off most quickly, are treated with solvents. These are usually the parts of the contact mass lying in the vicinity of the gas inlets in the contact mass receptacle.

The invention may also be put into practice by only periodically carrying out the treatment of the catalyzers with solvents. For example, in the case of a plurality of contact furnaces arranged serially or in parallel, which form a technical unit, so to speak, the arrangement may be such that at any time only one or one group of furnaces is operated with the solvent treatment according to the process of the invention. This will preferably be the furnaces most stressed at the time in question, in which the contact mass has been damaged most. When their activity has been restored to the desired level, the solvent treatment is discontinued and applied to another furnace or another group of furnaces. When a plurality of furnaces are serially arranged, the connection thereof may be constantly changed, for example in such a way which the initial gas enters the contact furnace that is just being treated with solvent, and thereafter flows through the others, which may be so connected that the furnace with the contact material completely treated last is the last in the row. The periodical treatment may also be applied in single or multistage synthesis when only a portion of the contact material is irrigated.

There is no objection to providing indirect cooling of the contact masses, in known manner, in the solvent treatment of the invention, for example by means of gilled coolers or similar apparatus, which are operated with suitable cooling media. This cooling is promoted, to a certain extent or becomes even superfluous, by the process of the invention, as the partial evaporation of the solvent, which usually occurs in the process of the invention, consumes considerable heat and has a cooling action, to a great extent within the catalyzer itself, if e. g. a recirculation of the cooled final gas into the fresh reaction gas from below upwards takes place.

The solvent may be recycled over or through the catalyzer in the process of the invention. A purification step is then preferably inserted in the circuit, by means of which the substances absorbed by the solvent, or a portion thereof, are constantly separated, or the injurious substances are rendered harmless by chemical conversion, acids, for example, being so treated by neutralization. Substances may also be added to the solvent which promote the catalytic conversion or conduct same in a desired direction, for example alkalis, which neutralize the organic acids produced as by-products in the catalysis, or mixtures of solvents are employed, when the mixture can be composed in accordance with the same principles. These measures may naturally also be applied if the recycling of the solvent is dispensed with.

In this process, the pressure and also to some extent the temperature are so adjusted that the extraction medium or a large part thereof remains liquid. It is possible, however, also to work at still higher pressure. The extraction medium may also be recycled, when it may be convenient to remove all or a part of the extracted substances before fresh introduction of the extraction medium into the contact mass. The liquid to be recycled can be cooled to a lesser or greater extent outside the contact mass, or it may be separated from the extract by evaporation and re-condensing.

The process according to the invention has the further advantage that besides the paraffin also resin-like substances, which represent one of the chief causes of injuries to the contact material, are removed in statu nascendi from the latter or at least in a soluble condition. It was not possible by the methods of extraction hitherto known adequately to free the contact material from such substances. An example for an extraction of a granulated and rigidly arranged catalyzer laden with more than 100% by weight of paraffin is given hereafter.

*Example 1*

265 grms. of a contact mass, exhausted in the synthesis of liquid hydrocarbons from carbon monoxide and hydrogen, corresponding to 100 grms. of original contact mass, were exhaustively extracted with light benzine, whereby 153 grms. of white paraffin were obtained after evaporation of the extraction medium. Following on the benzine extraction, the contact mass was extracted with acetone at the boiling temperature of acetone. After evaporation of the acetone, 11 grms. of a brown, resinous mass were obtained. Whereas the contact mass had increased only slightly in catalytic efficiency after the benzine extraction, the efficiency after the extraction with acetone was practically restored to that of a fresh contact mass. The extraction according to the process of the invention may be followed by treatment with hydrogen at an elevated temperature, for example at the temperature of the synthesis or also at a still higher temperature, particularly when the catalyzers are seriously damaged, or else the procedure may be to treat the catalyzer elevated temperature first with oxygen, for example air blown through, and then with hydrogen, before the process according to the invention or following thereon. The treatment of the catalyzer with hydrogen alone may also precede the extraction.

The most simple method of carrying out the herein described process is to pass the reaction gases upwardly through the contact furnace and partially to cool the gases upon or prior to their discharge from the furnace. For example, if the exhaust gases be cooled from a reaction temperature of 200° C. down to 100 to 150° C., the higher hydrocarbons alone will be condensed and flow back as reflux on to the catalyzer, whilst steam and benzine vapours will be led away. The reflux oils, on their part, effect the continuous extraction of the paraffin formed in the contact mass, and this paraffin will flow off, in liquid form, below, that is, countercurrent to the gases. By this means the paraffin concentration in the mass is lowered, and the tendency to form paraffin increased in consequence. On the other hand, the oils flowing back into the contact mass effect an additional formation of paraffin. This continuous extraction is suitably sustained by additional irrigating of hydrocarbons on the catalyzers, whereby according to the quantity of the irrigation liquids applied the temperature of the contact mass is raised by 10 to 50° C. above the temperature, which should be applied without irrigating the contact mass.

In normal working without additional impregnation or irrigation of the contact mass with solvents, the mass very soon becomes laden with paraffin to the extent of 100-300% of its own weight, the paraffin having a melting point exceeding 50° C. In carrying out the invention, the maximum yield of paraffin is obtained when care has been taken to prevent the contact mass from becoming burdened with more than 80% (preferably not more than 50%) of paraffin, and advisably less than 20% of the latter. It is advisable to keep the quantity of the sprinkling liquids applied at least equal to the quantity of hydrocarbons produced, whereby a three to four times greater quantity of sprinkling liquids may be applied. A limit is given by the porosity of the granulated contact mass and the flow of gas therethrough per hour.

When the reaction gases are passed upwardly through the contact furnace, the same reactions occur, at first, in the zone of entry of the gases, as in the case of the known method of operating with the gas passing downwardly through the catalyst.

The products of these reactions, however, flow off without having any opportunity of injuring further portions of the contact mass. Substantially, no reaction products, other than such as are vaporous at the reaction temperature, can ascend. At the end of a short working period the contact mass will be in such a condition that the uppermost layers, necessary for good catalysis, are still in a highly active condition, whilst the injury to the contact mass progresses upwardly only gradually.

Consequently, the gases are utilised to greater advantage and a higher yield of liquid products per cubic metre of synthesis gas (always calculated on a gas containing 100% of carbon monoxide and hydrogen) is obtained. This effect is increased by the circumstance that the highly concentrated admission gas encounters the contact mass that has suffered the greatest damage, whilst the gas which has already been extensively treated and is permeated with reaction products, encounters highly active contact material in the upper part of the furnace. The reaction is thus rendered more uniform and overheating phenomena, which are always accompanied by the formation of by-products and damage to the contact material, are reduced to a minimum.

A particular advantage of the present process is obtained when the reaction gases are employed under elevated pressure. Whereas, when the gas is passed from above downwards, under pressure, the injury to the contact mass progresses so rapidly that economical employment of pressure was hitherto considered hardly possible, the present process enables pressure, with all its advantages, such as increased velocity of reaction, smaller apparatus, and so forth, to be employed in a particularly favourable manner.

A further considerable advantage of the present process resides in the fact that, in effecting the necessary regeneration of the contact mass from time to time, by the passage of steam, hydrogen, nitrogen, oxygen or other gases, or by irrigation with solvents, the counter-flow principle can now be easily employed. Hitherto, it was necessary to perform this regenerative treatment from above downwards, and therefore with a flow coincident, in direction, with the course of the gases, since it was only in this manner that the substances—for the most part liquid—to be expelled from the contact mass can drop. The effect of such a regenerative treatment must therefore have been incomplete, unless large quantities of the regenerative media were employed. Now that, in accordance with the invention, the normal progress of the reaction is from below upwards, and the injury to the contact mass also proceeds in the same direction, it is possible, whilst retaining the customary regenerative treatment from above downwards, to operate in counterflow and, at the same time, not only economise very considerably in regenerative media, but also to improve the quality of the regenerated contact material.

*Example 2*

1000 kgs. of a contact mass consisting of 33% of cobalt, 6% of thorium oxide ($ThO_2$) (i. e. 18% $ThO_2$ of the cobalt in the catalyzer) and 61% of kieselguhr are filled into a contact furnace 3 metres in height, which contains, in known manner, numerous cooling elements, and a synthesis gas, which contains 90% of carbon monoxide and hydrogen in the proportion 1:2, is passed through the furnace from above downwards at the rate of 300 standard cubic metres per hour, calculated on a gas containing 100% carbon monoxide and hydrogen, a temperature of 180° C. and a pressure of 12 atmospheres being maintained in the furnace. Under these working conditions 130 grms. of higher hydrocarbons are found per standard cubic metre, made up of 30 grms. of benzine, 50 grms. of oil and 50 grms. of solid paraffin. If the same quantity of gas is passed from below upwards through the same contact furnace of the same pressure and at a temperature of 185° C., the quantity of liquid hydrocarbons formed per standard cubic metre remains unchanged at 130 grms., but the proportion of solid paraffin is raised to 65 grms., the other products being diminished in proportion. If the outgoing gas is now cooled to 125° C. at the top end of the furnace and at the same time the temperature in the furnace raised to about 195° C., the higher boiling hydrocarbons will condense, flow back into the furnace and, in accordance with the invention, extract the contact mass to an increased extent until the average loading with paraffin amounts to about 50% of the weight of the contact mass. By this extraction the harmful coating of the active zone of the contact material is lessened, so that greater formation of solid paraffin according to the invention occurs. With the same total yield, about 78 grms. of solid paraffin per standard cubic metre of gas are now produced. But if beside the reflux quantities by cooling the end gas on the top of the furnace additional 100 kg. per hour of a heavy gasoline (benzine) are irrigated on the contact mass at a still higher temperature of about 200° C. the yield of solid paraffin is raised to 88 grms.

*Example 3*

If the same contact furnace with the same catalyzer and the same quantity of gas as in Example 2 is traversed by the gas from above downwards, and at the same time the catalyzer is irrigated with a quantity of 50 kgs. per hour and at a temperature of 195° C. of an oil boiling between 150 and 250° C., 70 grms. of paraffin and 60 grms. of oil and benzine, which have to be distilled off from the irrigating oil, are obtained per standard cubic metre of gas calculated on a gas containing 100% monoxide of carbon and hydrogen. If the irrigation of the catalyzer with the aforesaid oil is increased to 150 kgs. per hour with the same quantity of gas (300 cubic metres per hour) and at a temperature of 202° C., 80 grms. of paraffin and 50 grms. of benzine and oil, i. e. a total of 130 grms. again, are obtained per standard cubic metre of gas, calculated on a gas containing 100% $CO+H_2$.

I claim:

1. In a process for obtaining hydrocarbons containing more than one carbon atom by the catalytic conversion of gas mixtures containing carbon monoxide and hydrogen in the presence of catalysts consisting of hydrogenating metals selected from the eighth group of the periodic system, difficultly reducible metal compounds and a preponderance of carrier substances at an elevated temperature below that at which methane would noramlly be formed as the chief reaction product with the use of the same gases and the same catalysts; the steps comprising, in combination, applying super-atmospheric pressure during said conversion, indirectly cooling the catalysts during the conversion, passing a solvent over the catalysts during the conversion which is adapted to free said catalysts from the paraffin formed which is solid at room temperature to maintain the enrichment of the catalysts with such paraffin below 100% of the weight of such catalysts when free from such paraffin, and recycling at least a portion of the end gas of such synthesis.

2. A process according to claim 1 in which gas mixtures are employed wherein the proportion of carbon monoxide with respect to the hydrogen is greater than 1:2.

3. A process according to claim 1 in which the quantity of carbon monoxide and hydrogen passed over the catalysts calculated on a gas mixture containing 100% carbon monoxide and hydrogen is maintained substantially at one normal cubic metre per hour per kilogram of hydrogenating metals in said catalysts.

4. In a process for obtaining hydrocarbons containing more than one carbon atom by the catalytic conversion of gas mixtures containing carbon monoxide and hydrogen in the presence of catalysts consisting of cobalt, thorium oxide, and a preponderance of kieselguhr at an elevated temperature below that at which methane would normally be formed as the chief reaction product with the use of the same gases and the same catalysts; the steps comprising, in combination, applying super-atmospheric pressure during said conversion, indirectly cooling the catalysts during the conversion, passing a solvent over the catalysts during the conversion which is adapted to free said catalysts from the paraffin formed which is solid at room temperature to maintain the enrichment of the catalysts with such paraffin below 100% of the weight of such catalyst when free from such paraffin, and recycling at least a portion of the end gas of such synthesis.

5. In a process for obtaining hydrocarbons containing more than one carbon atom by the catalytic conversion of gas mixtures containing carbon monoxide and hydrogen in the presence of catalysts consisting of hydrogenating metals selected from the eighth group of the periodic system, difficultly reducible metal compounds and a preponderance of carrier substances at an elevated temperature below that at which methane would normally be formed as the chief reaction product with the use of the same gases and the same catalysts; the steps comprising, in combination, applying super-atmospheric pressure during said conversion, maintaining a period of contact between the said gases and the catalysts of more than one minute, indirectly cooling the catalysts during the conversion, passing a solvent over the catalysts during the conversion which is adapted to free said catalysts from the paraffin formed which is solid at room temperature to maintain the enrichment of the catalysts with such paraffin below 100% of the weight of such catalysts when free from such paraffin, and recycling at least a portion of the end gas of such synthesis.

6. In a process for obtaining hydrocarbons containing more than one carbon atom by the catalytic conversion of gas mixtures containing carbon monoxide and hydrogen in the presence of catalysts consisting of hydrogenating metals selected from the eighth group of the periodic system, difficultly reducible metal compounds and a preponderance of carrier substances at an elevated temperature below that at which methane would normally be formed as the chief reaction product with the use of the same gases and the same catalysts; the steps comprising, in combination, applying super-atmospheric pressure during said conversion, maintaining a period of contact between the said gases and the catalysts which is from three to ten minutes, indirectly cooling the catalysts during the conversion, passing a solvent over the catalysts during the conversion which is adapted to free said catalysts from the paraffin formed which is solid at room temperature to maintain the enrichment of the catalysts with such paraffin below 100% of the weight of such catalysts when free from such paraffin, and recycling at least a portion of the end gas of such synthesis.

7. In a process for obtaining hydrocarbons containing more than one carbon atom by the catalytic conversion of gas mixtures containing carbon monoxide and hydrogen in the presence of catalysts consisting of hydrogenating metals selected from the eighth group of the periodic system, difficultly reducible metal compounds and a preponderance of carrier substances at an elevated temperature below that at which methane would normally be formed as the chief reaction product with the use of the same gases and the same catalysts; the steps comprising, in combination, applying super-atmospheric pressure during said conversion, indirectly cooling the catalysts during the conversion, passing a solvent over the catalysts during the conversion which is adapted to free said catalysts from the paraffin formed which is solid at room temperature to maintain the enrichment of the catalysts with such paraffin below 100% of the weight of such catalysts when free from such paraffin, maintaining a temperature during said conversion which is above the temperature which would be optimum when performing said catalytic conversion at atmospheric pressure and recycling at least a portion of the end gas of such synthesis.

WILHELM HERBERT.